United States Patent Office 3,038,005
Patented June 5, 1962

3,038,005
6-AMINO-5-HYDROXY-1,3-CYCLOHEXADIENE-1-CARBOXYLIC ACID
Jerry Robert Daniel McCormick, New City, N.Y., Newell Oscar Sjolander, Saddle River, N.J., and Ursula Hirsch and Jules Reichenthal, Pearl River, N.Y., assignors to American Cyanamid Company, New York, N.Y., a corporation of Maine
No Drawing. Original application June 20, 1958, Ser. No. 743,483. Divided and this application Feb. 13, 1961, Ser. No. 88,634
1 Claim. (Cl. 260—514)

This application is a division of our copending application Serial No. 743,483, filed June 20, 1958.

This invention relates to 6-amino-5-hydroxy-1,3-cyclohexadiene-1-carboxylic acid of the formula:

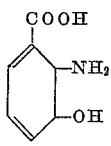

The above compound is a useful intermediate for the preparation of various benzoic acid derivatives such as, for example, anthranilic acid, 2-amino-3-hydroxybenzoic acid, and the like. The novel compound may be converted to anthranilic acid simply by heating in concentrated hydrochloric acid. As is well known, anthranilic acid is a valuable intermediate used in the preparation of indigo. The novel compound may also be converted to 2-amino-3-hydroxybenzoic acid by dehydrogenation in boiling water over a palladium catalyst. 2-amino-3-hydroxybenzoic acid is a biologically active nicotinic acid precursor [J.A.C.S. 70, 1847 (1948)].

The novel compound of this invention is produced by aerobically fermenting an aqueous nutrient medium with certain mutant strains of microorganisms of the species *Streptomyces aureofaciens*. A particularly preferred method involves the use of a new strain of *S. aureofaciens* which we have designed as S652, but certain other strains may also be used with varying degrees of effectiveness.

The new strain is a member of the species *S. aureofaciens* since it is a direct descendant of the chlortetracycline-producing strain of *S. aureofaciens*, A377, which was isolated from the soil and is described in the United States patent to Duggar No. 2,482,055, and which is deposited at the Northern Regional Research Laboratories, Peoria, Ill., as NRRL 2209. Mutagenic agents and selective agents used in obtaining this new strain include ultraviolet irradiation, nicotine and nitrogen mustard treatments, and phage exposure. Spontaneous mutation of chlortetracycline-producing strains of *S. aureofaciens* may also result in strains which will produce the new compound of this invention.

The new strain of *S. aureofaciens* which produces the new compound of this invention possesses the same general characteristics as do the strains which produce the tetracyclines and differs in the same general manner that the tetracycline-producing and chlortetracycline-producing strains of *S. aureofaciens* differ from each other, as has been described in a number of scientific papers which have been published.

The data appearing below will serve to illustrate the variation of Strain S652 from the original A377 strain available as NRRL 2209.

*Streptomyces aureofaciens* Strain S652 was differentiated from *Streptomyces aureofaciens* Strain A377 (NRRL 2209) by observation of growth characteristics on various media incubated at 26.5° C.

1. GLYCEROL ASPARAGINE BEEF EXTRACT AGAR

|  | Percent |
|---|---|
| Glycerol | 1.0 |
| L-Asparagine | 0.05 |
| Beef Extract | 0.2 |
| KH$_2$PO$_4$ | 0.05 |
| Bacto agar | 1.5 |
| Distilled water, q.s. | 100.0 |
| Adjustment with 50% KOH to pH | 7.0 |
| Post sterilization pH | 7.2 |

| | *Streptomyces aureofaciens* | |
|---|---|---|
| | Strain S652 | Strain A377 |
| Growth | Good to abundant, hyaline, white to apigmentous. | Good. |
| Aerial hyphae | Abundant | Slight to fair, white to light gray. |
| Sporulation | Abundant, fawn [1] to beaver.[1] | Light gray. |
| Diffusible pigment | Light olive yellow | Light yellow. |
| Reverse | White, hyaline | Yellow to light orange-yellow. |

[1] Color Harmony Manual, Third Edition, Container Corporation of America.

2. DEXTRIN CZAPEK-DOX AGAR

|  | Percent |
|---|---|
| Dextrin | 1.0 |
| NaNO$_3$ | 0.2 |
| K$_2$HPO$_4$ | 0.1 |
| MgSO$_4$·7H$_2$O | 0.05 |
| KCl | 0.05 |
| FeSO$_4$·7H$_2$O | 0.001 |
| Bacto agar | 1.5 |
| Distilled water, q.s. | 100.0 |
| Post sterilization pH | 7.2 |

| | *Streptomyces aureofaciens* | |
|---|---|---|
| | Strain S652 | Strain A377 |
| Growth | Thin, entire, semi-opaque, white. | Good. |
| Aerial hyphae | Trace, white | Abundant, mouse gray [1] to lead gray [1] water-white surface globules. |
| Sporulation | None | Profuse. |
| Diffusible pigment | do | Trace, pale yellow. |
| Reverse | White | Apigmentous, pink trace. |

[1] Color Harmony Manual, Third Edition, Container Corporation of America.

3. AP4 CORN STEEP AGAR

|  | Percent |
|---|---|
| Corn steep | 0.4 |
| Sucrose | 1.0 |
| $MgSO_4 \cdot 7H_2O$ | 0.025 |
| $KH_2PO_4$ | 0.2 |
| $(NH_4)_2HPO_4$ | 0.2 |
| Bacto agar | 2.0 |
| Tap water, q.s. | 100.0 |
| Post sterilization pH | 6.5 |

|  | Streptomyces aureofaciens | |
|---|---|---|
|  | Strain S652 | Strain A377 |
| Growth | Excellent, white to nude tan.[1] | Excellent. |
| Aerial mycelium | Abundant, white | Abundant, fawn.[1] |
| Sporulation | Abundant, fawn [1] to beaver.[1] | Profuse, uniform. |
| Soluble pigment | Tawny to light amber. | Light yellow to amber |
| Reverse | White to nude tan [1] | Light tan.[1] |

[1] Color Harmony Manual, Third Edition, Container Corporation of America.

4. OTHER MEDIA

| Medium | Streptomyces aureofaciens | |
|---|---|---|
|  | Strain S652 | Strain A377 |
| Nutrient Agar | Sparse growth, hyaline to semiopaque white. No aerial hyphae. Reverse: white. No soluble pigment. | Good growth. No aerial hyphae. Reverse: pale yellow. Pale yellow soluble pigment. |
| Glucose Asparagine Meat Extract Agar. | Fair growth: white. Sparse aerial mycelium: White becoming brown to rose taupe.[1] Reverse: white. Light yellow soluble pigment. Sporulation: sparse. | Good growth. Aerial hyphae white becoming increasingly gray with increase with spore formation. Reverse: light yellow to pink-orange. Trace: yellow-orange soluble pigment. |

| Medium | Streptomyces aureofaciens | |
|---|---|---|
|  | Strain S652 | Strain A377 |
| Waksman's Agar | Fair to good growth: chartreuse tint.[1] Aerial mycelium: sparse to abundant, fawn.[1] Sporulation: sparse to abundant. Reverse: hyaline, chartreuse tint.[1] Light yellow soluble pigment. | Good growth. Aerial hyphae fair becoming abundant: white to taupe brown.[1] Reverse: camel [1] to adobe brown.[1] Light yellow soluble pigment. |
| Potato Slants | Excellent, smooth, moist, nodulated growth: light fawn [1] to beige.[1] Trace of white aerial mycelium. No soluble pigment. | Profuse, moist, smooth, nodulated growth: light brown yellow [1] to beige [1] to cedar.[1] No soluble pigment. |
| Purple Milk | No observable change | Slight white to pale yellow growth collar. Little significant pH change nor apparent peptonization in 14 days. |

[1] Color Harmony Manual, Third Edition, Container Corporation of America.

5. MICROSCOPIC OBSERVATIONS

| Medium | Streptomyces aureofaciens | | | |
|---|---|---|---|---|
|  | Strain S652 | | Strain A377 | |
|  | Mycelium | Spores | Mycelium | Spores |
| Glycerol Asparagine Meat Extract Agar. | Flexuous, continuous, branched. Diam. 0.5–1.5μ. | Spheroidal to ovoidal. Diam. 0.5–1.0μ. | Flexuous, continuous, branched. Diam. 1.0–1.2μ. | Spheroidal to ovoidal. Diam. 1.2–1.5μ. |
| AP4 Corn-steep Agar. | Flexuous, continuous, branched. Diam. 0.5–0.7μ. | Spheroidal to ovoidal. Diam. 0.5μ. | Flexuous, continuous, branched. Diam. 0.8–1.0μ. | Spheroidal to ovoidal. Diam. 1.2–1.5μ. |
| Waksman's Agar | Flexuous, continuous, branched. Diam. 0.5–1.0μ. | Spheroidal to ovoidal. Diam. 0.5–1.0μ. | Flexuous, continuous, branched. Diam. 0.5–1.0μ. | Spheroidal to ovoidal. Diam. 0.5–1.0μ. |

Mycelial and spore morphology of *Streptomyces aureofaciens* Strain S652 is apparently similar to that of the original Strain A377.

Viable cultures of mutant *S. aureofaciens* Strain S652 which produce the new compound of this invention have been deposited with the American Type Culture Collection in Washington, D.C., where this strain has been assigned accession number ATCC 13,189.

It is to be understood that the invention is not limited to the use of Strain S652 for the production of the novel compound herein as other strains of *S. aureofaciens* may also be used with varying degrees of effectiveness for the production of this compound as is indicated hereinabove. To determine whether a selected colony will produce the new compound, it is necessary merely to cultivate a strain of *S. aureofaciens* in a fermentation flask and at the end of the fermentation period, filter the mash and examine the neutral filtrate spectrophotometrically for ultraviolet absorption at 278–280 mμ, characterizing the product in terms of its extinction coefficient value $$(E_{1\,cm.}^{1\%})$$

of 570.

The conditions of the fermentation with the new strain of *S. aureofaciens* of this invention are generally the same as those presently known for cultivating *Streptomyces* for the production of antibiotics or other products. Thus, the fermentation medium contains the usual nutrients and mineral substances. Suitable nutrient substances include starch, dextrose, cane sugar, glucose, molasses, soybean meal, peanut meal, yeast, meat extracts, peptone, ammonium sulfate, urea, corn steep liquor, distillers' solubles, fish meal and other conventional substances. The inorganic salts include calcium carbonate, ammonium sulfate, ammonium chloride, and the various trace elements such as manganese, cobalt, zinc, copper, iron and the like.

In general, the fermentation is carried out for about 48 to 200 hours and at temperatures ranging from about 20–40° C. The pH may range from 5.5–7.5.

The new compound of this invention may be isolated from the fermentation mash in any suitable manner. A preferred procedure involves an ion exchange separation in which the fermentation mash is filtered, and the filtrate is acidified to pH 1 to 2 with a suitable mineral acid such as hydrochloric acid, sulfuric acid, etc. The acidified aqueous filtrate is passed through an Amberlite IR–120 cation exchange resin column and the column is developed in the usual manner with an aqueous mineral acid, i.e., normal sulfuric acid. The eluted fraction is made alkaline by the addition of solid barium hydroxide with stirring. Barium sulfate precipitates and is filtered off while the pH of the aqueous solution is above pH 12. The filtrate is then neutralized with sulfuric acid and is concentrated in vacuo. Crystallization of the crude product occurs rapidly at room temperature (25°±5° C.). The product may then be purified in a standard manner by recrystallization from glacial acetic acid.

The invention will be described in greater detail in conjunction with the following specific examples.

Example 1

A typical medium used to grow the primary inoculum is prepared according to the following formulation:

| | |
|---|---|
| Sucrose | grams 30.0 |
| Ammonum sulfate | do 2.0 |
| Calcium carbonate | do 7.0 |
| Corn steep liquor | milliliters 16.5 |
| Water to 1000 milliliters | |

Aliquots of this inoculum medium are placed in 8 inch test tubes which are sterilized at 120° C. and 15 pounds pressure for 20 minutes. Spores of a strain of *S. aureofaciens* capable of producing 6-amino-5-hydroxy-1,3-cyclohexadiene-1-carboxylic acid, such as Strain S652, are washed from an agar slant with sterile distilled water to form a suspension containing approximately $60 \times 10^6$ spores per milliliter. A 0.33 milliliter portion of this suspension is added to each 8-inch test tube containing the sterilized medium. These inoculated tubes are incubated for 24 hours at 28° C. on a reciprocating shaker operating at 116 oscillations per minute.

Example 2

A typical synthetic medium which may be used in the fermentation process employing strains of *S. aureofaciens* to produce the new compound of this invention is prepared according to the following formulation:

| | |
|---|---|
| Corn starch | grams 55.0 |
| $CaCO_3$ | do 9.0 |
| $(NH_4)_2SO_4$ | do 5.0 |
| $NH_4Cl$ | do 1.5 |
| $MgCl_2.6H_2O$ | do 2.0 |
| KCl | milligrams 1280 |
| $H_3PO_4$ | do 400 |
| $FeSO_4.7H_2O$ | do 60 |
| $MnSO_4.4H_2O$ | do 50 |
| $ZnSO_4.7H_2O$ | do 100 |
| $CoCl_2.6H_2O$ | do 5 |
| Water to 1000 milliliters | |

A 25 milliliter aliquot of this fermentation medium and 0.50 milliliters (2.0%) of lard oil are placed in a series of 250 milliliter Erlenmeyer flasks which are then sterilized at 120° C. and 15 pounds per square inch pressure for 20 minutes. The Erlenmeyer flasks are then inoculated with 1.0 milliliter of inoculum of *S. aureofaciens* S652 prepared according to the procedure of Example 1, and incubated at 27° C. for 96 hours on a rotary shaker operating at 180 revolutions per minute. The mash is assayed spectrophotometrically and is found to contain 3200 micrograms per milliliter of 6-amino-5-hydroxy-1,3-cyclohexadiene-1-carboxylic acid.

Example 3

25 milliliter aliquots of the synthetic fermentation medium shown in Example 2 and 0.50 milliliters (2.0%) of lard oil are placed in a series of 250 milliliter Erlenmeyer flasks. These flasks are sterilized at 120° C. and 15 pounds per square inch pressure for 20 minutes. Following the sterilization procedure, 1.0 milliliter of inoculum of a strain of *S. aureofaciens* capable of producing 6-amino-5-hydroxy-1,3-cyclohexadiene-1-carboxylic acid, prepared according to the procedure of example 1, is added to each flask and the flasks are incubated at 27° C. for 96 hours on a rotary shaker operating at 180 revolutions per minute. The mash is assayed spectrophotometrically and is found to contain 3900 micrograms per milliliter of 6-amino-5-hydroxy-1,3-cyclohexadiene-1-carboxylic acid.

Example 4

A fermentation medium of the following formulation is prepared:

| | |
|---|---|
| Corn starch | grams 55.0 |
| Corn steep | do 30.0 |
| Cotton seed meal | do 2.0 |
| $CaCO_3$ | do 7.0 |
| $(NH_4)_2SO_4$ | do 5.0 |
| $NH_4Cl$ | do 1.5 |
| $FeSO_4.7H_2O$ | milligrams 40.0 |
| $MnSO_4.4H_2O$ | do 50.0 |
| $ZnSO_4.7H_2O$ | do 100.0 |
| $CoCl_2.6H_2O$ | do 5.0 |
| Water to 1000 milliliters | |

A 25 milliliter aliquot of this fermentation medium and 0.625 milliliter (2.5%) of lard oil are placed in a series of 250 milliliter Erlenmeyer flasks which are then sterilized at 120° C. and 15 pounds per square inch pressure for 20 minutes. The Erlenmeyer flasks are then inoculated with 1.0 milliliter of inoculum of *S. aureofaciens* Strain S652 prepared according to Example 1, and the flasks are incubated at 27° C. for 120 hours on a rotary shaker operating at 180 revolutions per minute. This mash is assayed spectrophotometrically and is found to contain 7350 micrograms per milliliter of 6-amino-5-hydroxy-1,3-cyclohexadiene-1-carboxylic acid.

Example 5

The procedure of the preceding example is repeated except that the temperature is maintained at 37° C. with a 6-amino-5-hydroxy-1,3-cyclohexadiene-1-carboxylic acid producing strain of *S. aureofaciens*. At the end of the fermentation, the mash is assayed spectrophotometrically and is found to contain 5050 micrograms per milliliter of 6-amino-5-hydroxy-1,3-cyclohexadiene-1-carboxylic acid.

Example 6

Ten liters of a fermentation prepared as in Example 4 is filtered and the pH of the filtrate is adjusted to pH 1.5 with concentrated hydrochloric acid. Spectrophotometric analysis of this filtrate shows 6.5 milligrams of 6-amino-5-hydroxy-1,3-cyclohexadiene-1-carboxylic acid per milliliter of filtrate. This acidified mash filtrate is put through a 3-inch diameter containing 3 kilograms of Amberlite IR-120 (H-form) cation exchange resin. The resin column is then washed with 15 liters of distilled water. The column is eluted to extract the activity with 20 liters of normal sulfuric acid solution. The eluate is made alkaline (pH 12) by the addition of solid barium hydroxide with stirring. The resulting barium sulfate precipitate is filtered off. The filtrate is neutralized with sulfuric acid and the precipitated barium sulfate is again filtered off. The barium sulfate filter cake is washed with distilled water. The filtrates are combined and concentrated by vacuum distillation to about 100 milliliters. Crystallization of the tan-white solid occurs rapidly at room temperature (25°±5° C.) on seeding the concentrate (weight, 16.1 grams). The crude product is purified by repeated recrystallizations from glacial acetic acid. A pure crystalline product having a melting point of 190–191° C. with decomposition is obtained. The white crystalline solid is soluble in water and insoluble in chloroform and ether. The pKa value is 8.6. The ultraviolet spectrum indicates a strong single peak at 278 m$\mu$, $\epsilon = 8,866$ in 1 molar acid solution. The optical rotation $[\alpha]_D^{25}$ (0.5% in 0.1 N HCl solution) = +474°; 0.5% in 0.1 N NaOH·solution = +599°; and 2.0% in distilled water = +456°.

*Analysis.*—Calculated for $C_7H_9O_3N$: C, 54.20; H, 5.81; O, 31.00; N, 9.02. Found: C, 53.34; H, 6.43; O, 31.37; N, 8.86.

Example 7

6-amino-5-hydroxy-1,3-cyclohexadiene-1-carboxylic acid is quantitatively converted to anthranilic acid by heating (50–60° C.) with concentrated hydrochloric acid. The half-life of the reaction ($t\frac{1}{2}$) is about one hour. Anthranilic acid is identified by ultraviolet absorption spectrum, paper chromatographic evidence, and by identical melting point and mixed melting point values utilizing an anthranilic acid standard, and by comparison of its N-acetyl derivative with an authentic specimen.

Example 8

To 1.0 gram of 6-amino-5-hydroxy-1,3-cyclohexadiene-1-carboxylic acid is added 100 milliliters of water and 1.0 gram of dehydrogenation catalyst (10% palladium on carbon). The mixture is heated at reflux for 2 hours. The hot solution is filtered. On cooling, the filtrate yields a tannish-pink crystalline solid which is separated by filtration. The solid is recrystallized twice from hot methanol, using Darco G-60 as a decolorizing agent; and yielding 225 milligrams of recrystallized product with a melting point of 249°–250° C. (with decomposition) in agreement with the literature value for 2-amino-3-hydroxybenzoic acid. The ultraviolet absorption curves of 2-amino-3-hydroxybenzoic acid as given in the literature [J.A.C.S. 70, 1848, (1948)] and the product obtained by this example are identical.

We claim:

6-amino-5-hydroxy-1,3-cyclohexadiene-1-carboxylic acid.

No references cited.